Jan. 9, 1968   B. R. OXEL   3,362,294
APPARATUS FOR FINISHING SHEET MATERIAL
Filed July 6, 1964   5 Sheets-Sheet 3
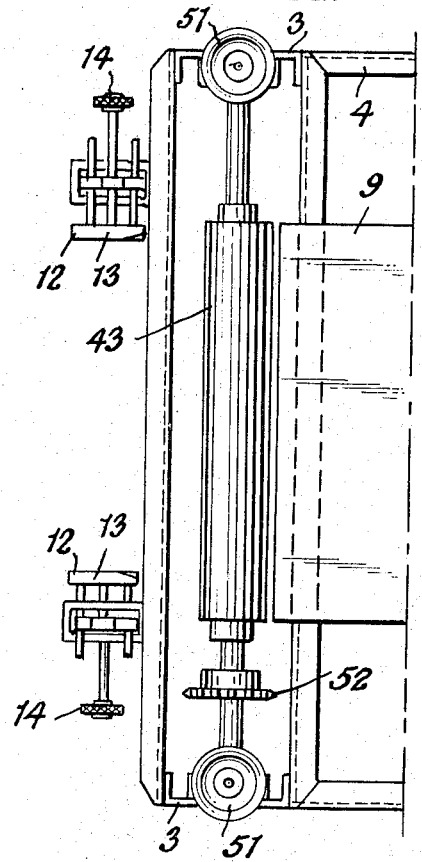
FIG. 2a.
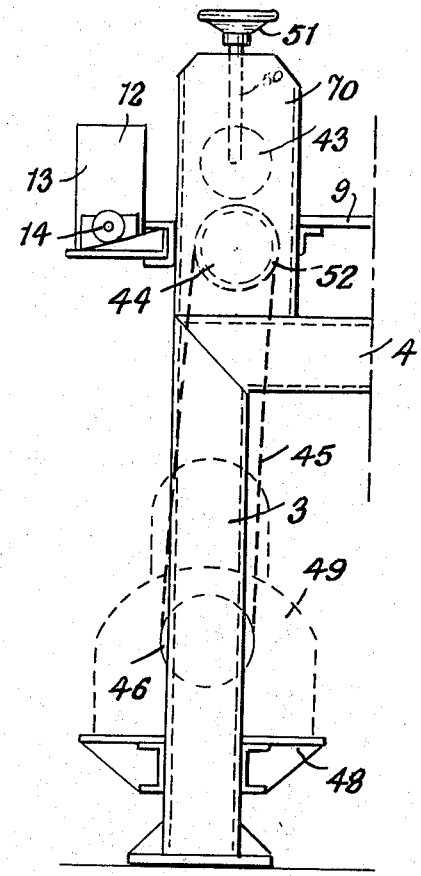
FIG. 1a.
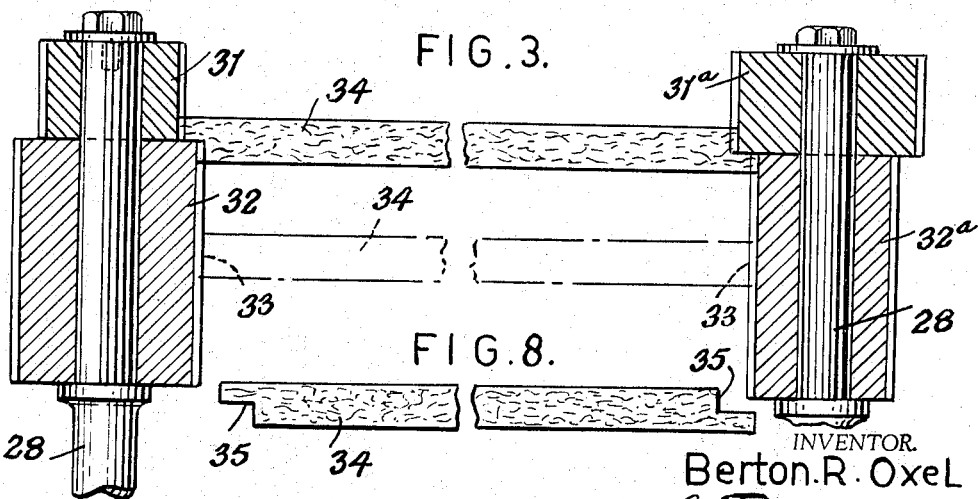
FIG. 3.
FIG. 8.
INVENTOR.
Berton R. Oxel
BY
Attorney

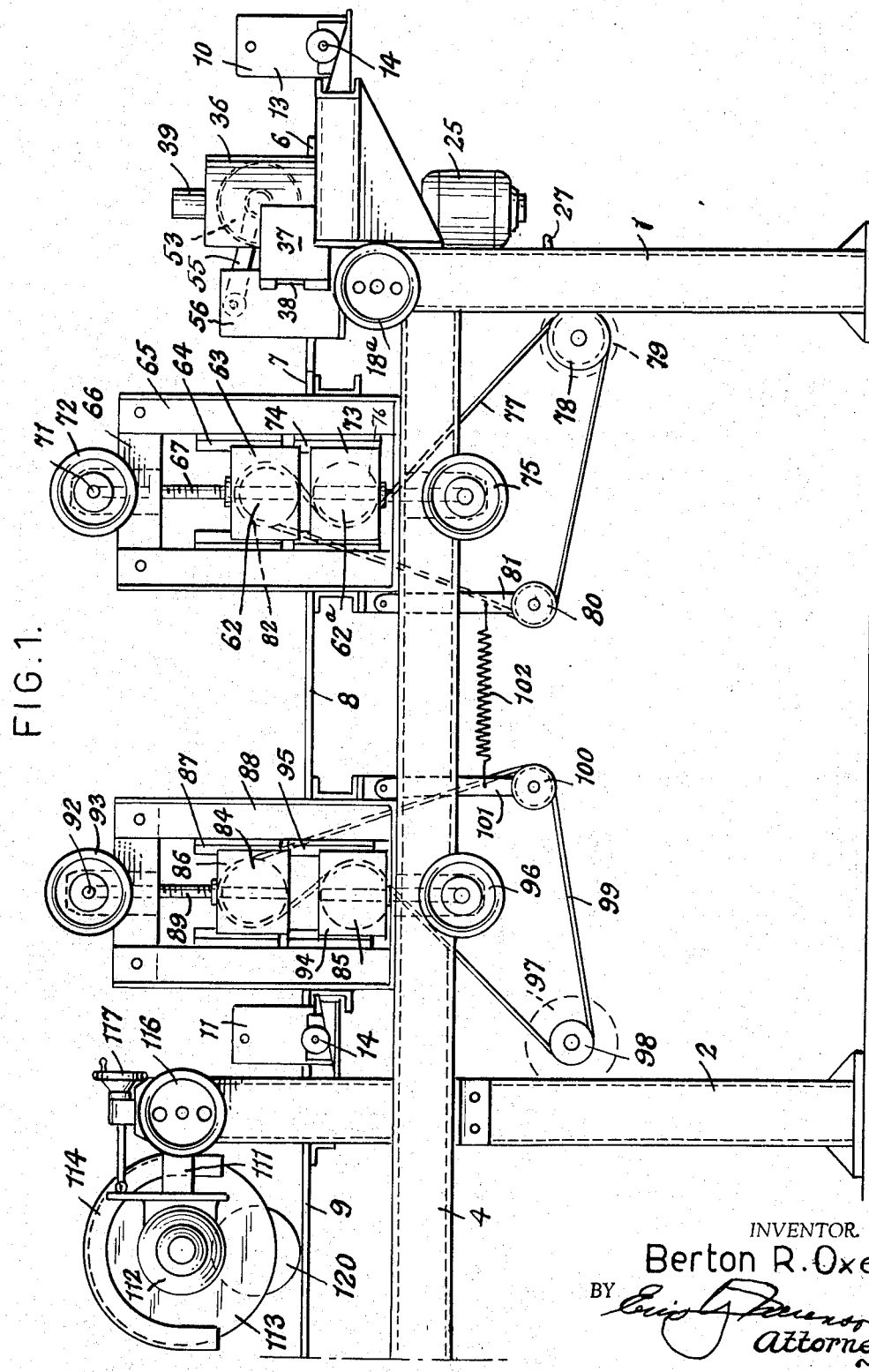

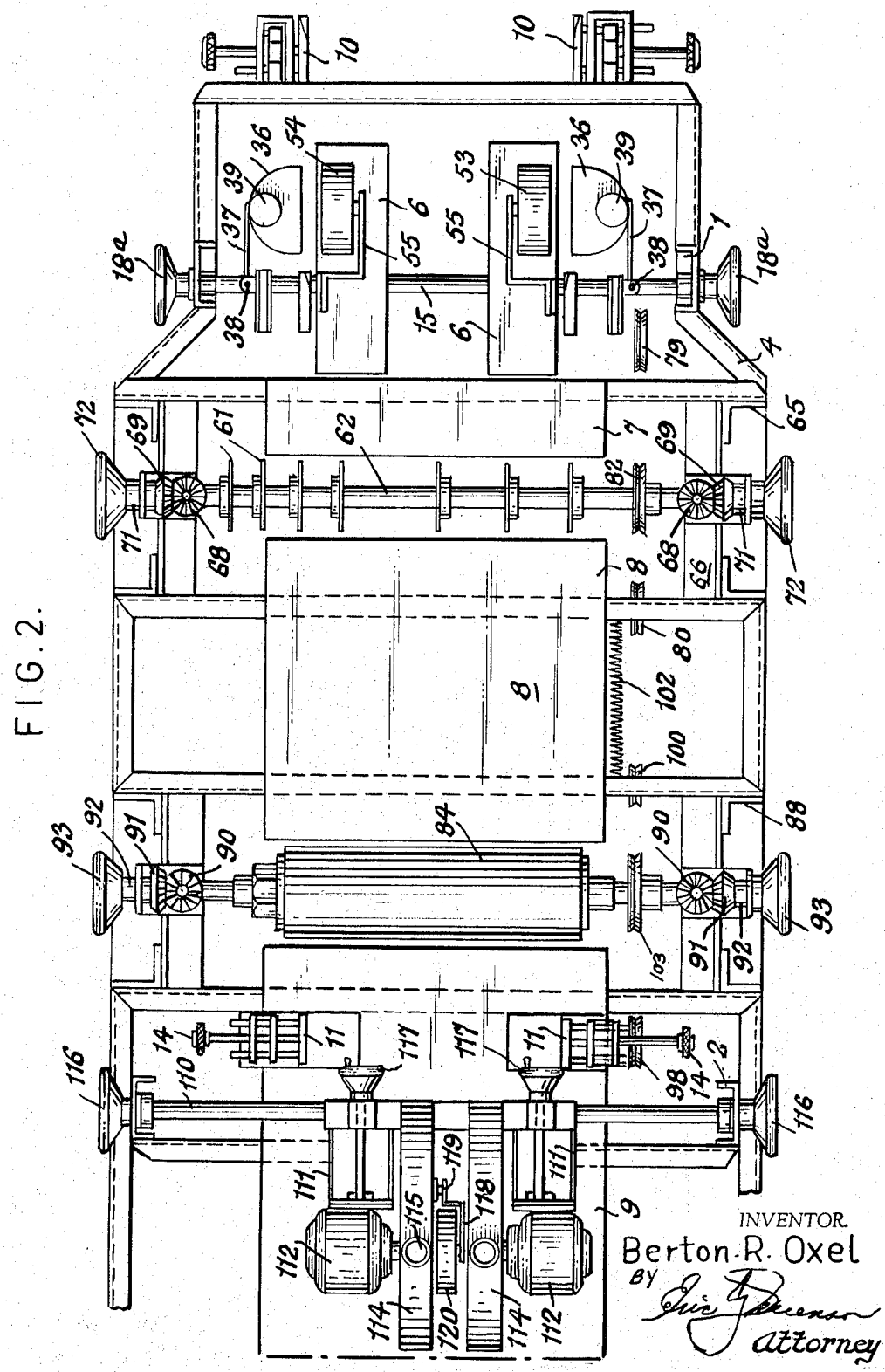

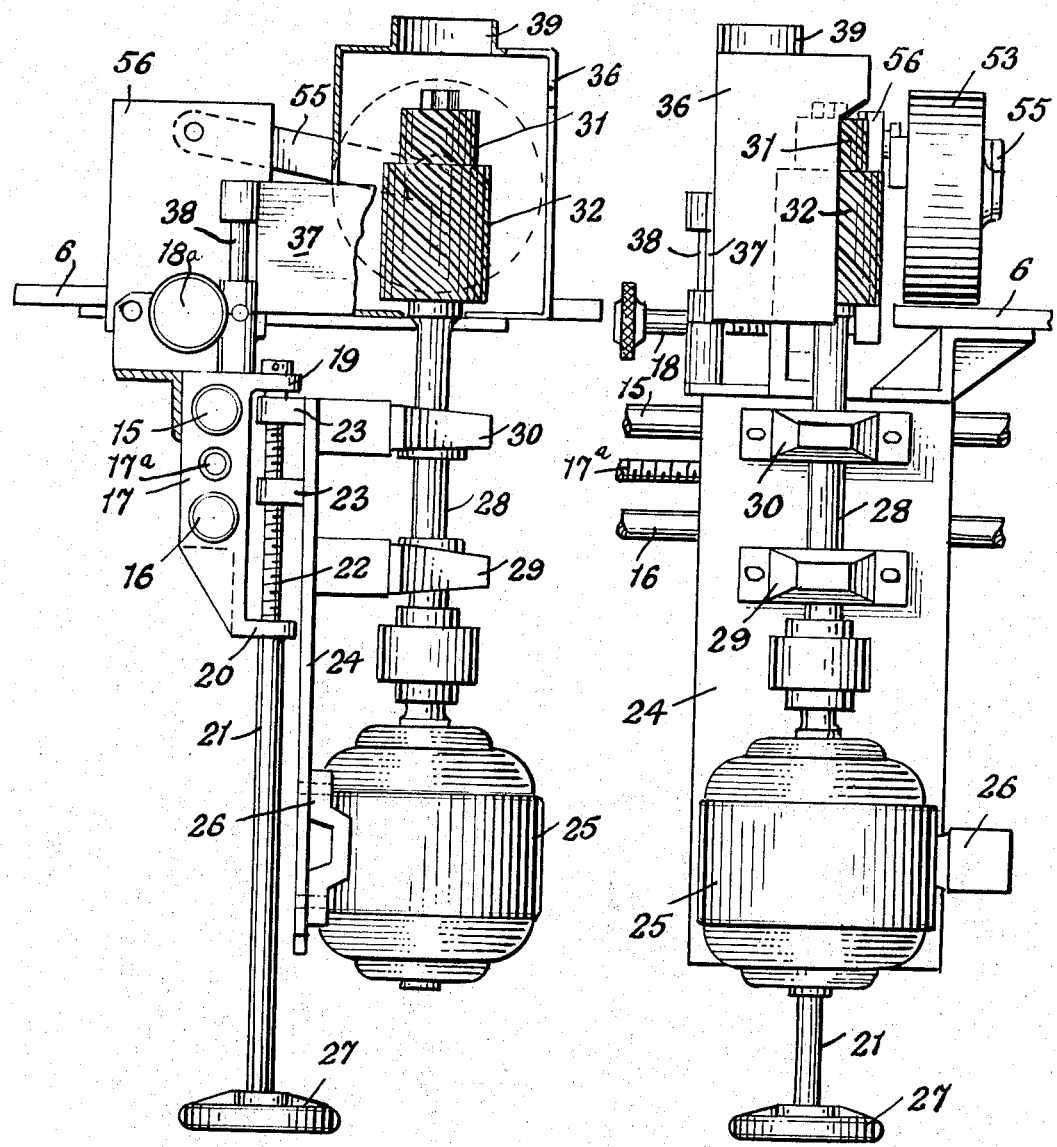

Jan. 9, 1968   B. R. OXEL   3,362,294
APPARATUS FOR FINISHING SHEET MATERIAL
Filed July 6, 1964

INVENTOR.
Berton R. Oxel
BY
Attorney

United States Patent Office 3,362,294
Patented Jan. 9, 1968

3,362,294
APPARATUS FOR FINISHING SHEET MATERIAL
Berton R. Oxel, New Castle, Pa., assignor to Dyfoam Corporation, New Castle, Pa., a corporation of Pennsylvania
Filed July 6, 1964, Ser. No. 380,360
8 Claims. (Cl. 90—11)

ABSTRACT OF THE DISCLOSURE

An apparatus for finishing paneling, and particularly paneling composed of foam plastic or like material, the apparatus including oppositely-arranged adjustable edge trimmers operative on the opposite edges of paneling that can be continuously fed into the apparatus. Pressure rollers hold down the paneling at the edge trimmers. After being edge-trimmed, the paneling reaches grooving rolls which produce longitudinal grooves in the paneling. After being grooved, the paneling reaches surfacing rollers which surface its opposite faces. After being surfaced, the paneling passes under slitting knives which split the paneling into sections of selected width and then the paneling reaches a cutter that operates transversely of the paneling to separate it into sections of desired length, these sections being then discharged from the apparatus. The various trimming, grooving, surfacing and slitting instrumentalities are made adjustable and are therefore arranged to be selectively made operative or inoperative so that any one of the operations mentioned can be eliminated as the paneling passes through the apparatus.

---

This invention relates to apparatus for finishing sheet material such as, for example, foam plastic paneling of the character used for insulation and for many other known purposes.

In co-pending application Ser. No. 258,105, filed Feb. 7, 1963, is shown an apparatus for manufacturing sheet material or paneling of the kind that is operated upon by the apparatus of the present invention. The present invention contemplates the provision of an apparatus which is capable for use in shaping and finishing the edges of the paneling; which can be used to form longitudinal grooves in the paneling and in the opposite faces thereof; which can finish opposite faces of the paneling; which can sever the paneling into lengths of desired size, and which will deliver the panel lengths thus produced to a suitable support or carrier.

It is an object of the invention to provide an apparatus of the above-mentioned character which will not only perform all of the enumerated functions in sequence if desired, but which will enable the several mechanisms to perform their respective functions selectively and independently when required.

With these and other objects to be hereinafter set forth in view, I have devised the arrangement of parts to be described and more particularly pointed out in the claims appended hereto.

In the accompanying drawings, wherein an illustrative embodiment of the invention is disclosed, FIG. 1 is a side elevation of a substantial part of the apparatus to which the present invention relates;

FIG. 1a is a continuation of the left end of FIG. 1;

FIG. 2 is a top plan view of the portion of the apparatus shown in FIG. 1;

FIG. 2a is a continuation of the left end of FIG. 2;

FIG. 3 is a sectional view of the cutters which finish the opposite edges of the paneling;

FIG. 4 is a side elevational view of the edge-finishing mechanism;

FIG. 5 is a view of the mechanism of FIG. 4 as seen from the right of FIG. 4;

FIG. 8 is an end view of one of the panels showing its opposite edges formed in "ship-lap" form by the edge-finishing means.

Figure 7:
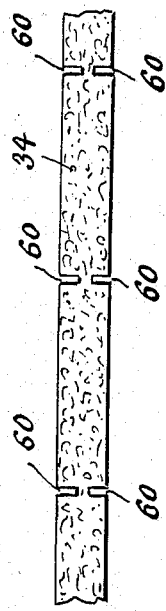
FIG. 7 is an end view of one of the panels showing the grooves produced therein by grooving mechanism forming a part of the apparatus.

Referring to the drawings, there is therein shown the frame of the machine, and which includes a plurality of posts or stanchions indicated respectively at 1, 2 and 3, supporting longitudinal rails 4, the latter being connected by suitable crossings to form a lengthy, strong and rigid frame structure.

The sheet material or paneling on which the present structure operates is actually produced by apparatus herein shown, and such apparatus may be similar to that shown in co-pending application Ser. No. 258,105 or by other suitable means. It is sufficient to herein state that the paneling or sheet material produced by the above-mentioned apparatus or by other suitable means, is moved from such apparatus from the right of FIGS. 1 and 6 and it is received upon and moved along suitable horizontal supports such as the table elements indicated respectively at 6, 7, 8 and 9. Along the line of movement of the sheet material or paneling, there is provided a number of edge guides which are shown at 10, 11 and 12 in order to suitably guide the material as it progresses from one stage of the apparatus to the next. These guides, which include upstanding guide plates 13 have such plates made adjustable by means of the threaded adjusting screws 14 in order to enable the guides on the opposite sides of the machine to be adjusted to or from one another to thereby accommodate sheet material or paneling of different widths.

The first stage to which the sheet material or paneling is brought, is that at which the opposite edges of the paneling are shaped or finished. By this mechanism, the opposite longitudinal edges of the paneling can be shaped in various ways, two examples of which are shown respectively in FIGS. 3 and 8. In the example shown at the top of FIG. 3 and also in FIG. 8, the edges of the paneling are stepped or formed with the so-called "ship-lap" form to provide for the conventional overlap of the panels when they are installed. The dot-and-dash lines in FIG. 3 show how the edges of the paneling can be finished with conventional flat or straight edging.

The apparatus for trimming and finishing the edges in the manner described, and providing other edge formations, is disclosed in detail in FIGS. 4 and 5.

Mounted on guide rods 15 and 16 and on a threaded shaft 17a, which rods and shaft extend transversely of the frame of the machine, there is provided adjacent to each of the longitudinal sides of the machine, a bracket 17 which is adjustable transversely of the machine by means of the hand wheels 18a. Said bracket is provided with lugs 19 and 20 in which a shaft 21 is rotatably mounted. Said shaft has a threaded portion 22 which threadably engages with lugs 23 provided on a plate 24 on which a motor 25 is mounted by means of a mounting bracket 26.

The shaft 21 is provided with a hand-wheel 27 at its lower end, and by the rotation of the hand-wheel the motor and the parts associated therewith can be raised or lowered as required to position the edge trimmers in the positions needed for the desired trimming effect on the opposite edges of the sheet material or paneling.

The shaft 28, rotatively driven from the motor 25, extends upwardly through bearings 29 and 30 projecting from the plate 24 and at its upper end the shaft receives a plurality of milling cutters 31, 32. Two of these cutters are shown on each of the shafts 28 but this number may be increased as required. It will be noted that the two cutters 31 and 32 are of different diameters. Thus, when it is desired to produce an ordinary straight edge on the paneling 34 as shown in FIG. 3, the cutters are positioned at the right height so that one of the cutters on each side of the machine, contacts the edges of the paneling and produces the required edge shape thereon. When it is desired to produce ship-lap edges on the paneling, as shown at 35 in FIG. 8, the cutters can be lowered by the manipulation of the hand-wheel 27 to cause parts of two cutters on each side of the machine to engage the edges of the sheet and shape them into the required ship-lap formation. It will be observed that the cutters 31 and 32 at one side of the machine are arranged with the cutter of smaller diameter uppermost, while the cutters at the opposite side of the machine have the smaller-diameter cutter 32a arranged lowermost and with the larger-diameter cutter 31a arranged above. This produces the required disposition of the tongues on the opposite edges of the paneling as clearly shown in FIG. 8.

The cutters are covered by pivotally mounted hoods or guards 36, each of which is attached by a plate 37 pivoted on a post 38. The hoods each have an outlet 39 at the top, the same being attached to a flexible dust collection tube 40 that attaches to a dust-outlet pipe 41. The foregoing arrangement is such that the paneling 34 is moved along the table sections 7, 8 and 9 while its edges are being trimmed and shaped as required and as above described.

The movement of the paneling 34 through the apparatus is made positive by means of feed rolls 43 and 44 shown in FIGS. 1a and 2a which are rotative in bearings provided in supports 70. The lower feed roll, or that shown at 44, has its shaft provided with a pulley 52 that is driven by a pulley 45 from pulley 46 driven from the motor 49 supported on the base 48. Adjustment of the upper roll 43 to or from the roll 44 is had by means of the hand-wheel 51 and the threaded adjusting screw 50. During the edge trimming of the paneling 34, the said material is held down by pressure rollers 53 and 54, each of said rollers being rotatively carried on an arm 55 on a support 56.

In the manufacture of the paneling it is sometimes found desirable to provide the same with longitudinal grooves as shown at 60 in FIG. 7. Such grooves, extending inwardly from the opposite faces of the paneling, provide break-off points at which sections of the sheet may be detached. In the present apparatus, the sheets are grooved in the manner above mentioned by means of the disks shown at 61 in FIG. 2. A set of these disks is mounted on an upper shaft 62 journalled at its ends in vertically-adjustable bearing blocks 63 (FIG. 1) which are vertically guided in guides 64 supported in a frame composed of uprights 65 connected at the top by a cross member 66. The bearing blocks, and hence the shaft 62 journalled therein, are adjustably raised or lowered by means of a threaded rod 67 provided at its upper end with a bevel gear 68 in mesh with a bevel gear 69 fixed on a manually rotative shaft 71 terminating in a hand-wheel 72. It will be apparent that by the rotation of the hand-wheel 72 the shaft 62 can be raised or lowered to regulate the depth of the grooves formed in the paneling.

Figure 6:
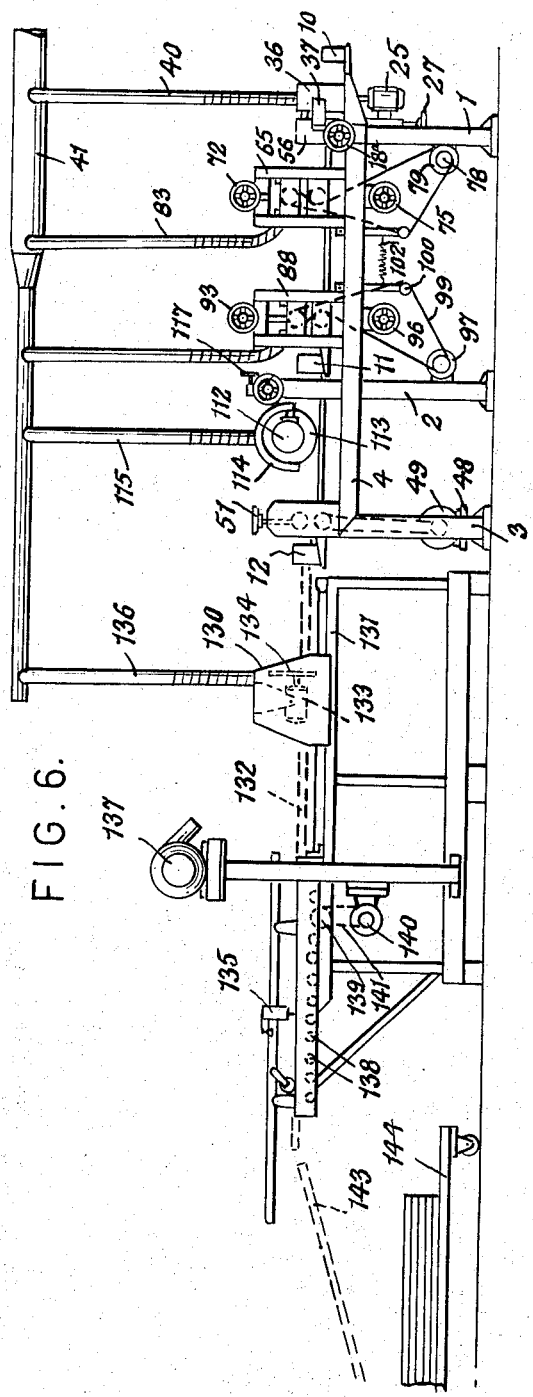
FIG. 6 is a side elevational view of the entire apparatus.

The lower shaft 62a is similar to the shaft 62 and it carries similar grooving disks. Shaft 62a is mounted in bearing blocks 73 which are adjustable in guides 74 by means of a bevel gear arrangement as described in connection with the shaft 62, the latter gearing being operative by means of the hand-wheel shown at 75. The lower shaft 62a carries a pulley 76 which is engaged by a belt 77 extending around a sprocket or pulley 78 on the motor 79. Said belt engages an idler pulley 80 carried by a pivoted, spring-biased arm 81 and from said idler pulley the belt extends around a pulley 82 carried by the shaft 62, and it then engages a pulley 76. The above arrangement is such as to rotate the upper and lower grooving shafts in opposite directions, with said shafts being adjustable toward or away from one another to set the disks apart for the required distance to thereby control the depth of the grooves produced in the paneling. A dust collection tube 83 leads from the grooving mechanism to the dust collection pipe 41 substantially as shown in FIG. 6.

In the production of the paneling it may be found necessary or desirable to finish the opposite surfaces of the material and for this purpose the material is moved between a pair of surfacing rollers which are shown respectively at 84 and 85 in FIG. 1. The upper roller shown at 84 is journalled in bearings or bearing blocks 86 which are vertically guided in guides 87 supported by the frame 88. The threaded rod 89, engaging the block 86 carries a bevel gear 90 engaging a bevel gear 91 fixed on a horizontal shaft 92 provided with a hand-wheel 93. By rotation of the hand-wheel the upper roller 84 can be raised or lowered as required.

The lower roller is similarly journalled at its ends in the bearing blocks 94 which are vertically adjustable in guides 95. A bevel gearing arrangement similar to that employed for the upper roller 84 is used for the lower roller, said gearing being operated by the turning of a hand-wheel 96. A motor 97 drives a pulley 98 accommodating drive belt 99 which has a stretch engaging the idler pulley 100 carried by the pivoted arm 101 that is biased by the spring 102. From the idler pulley 100 the belt 99 extends around a pulley 103 (FIG. 2) carried on the shaft of upper roller 84 and from which it extends to engage a pulley carried by the shaft of roller 85, to thereafter return to the motor pulley 98. This arrangement is such that both of the rollers 84 and 85 are vertically adjustable and are driven in opposite directions by the belt drive described, and as the material passes between the rollers both of the surfaces of the material will be operated upon by the rollers, the surfaces of which will bear the required means to provide the desired facial finish on both faces of the material.

The mechanism shown at the left end of FIG. 2 consists of means by which the sheet material or paneling can be longitudinally split or severed, when it is desired to provide panels of various widths. Said mechanism includes a cross shaft 110 upon which a pair of slitting units are mounted for adjustment on said shaft to thereby position them at the required distances apart to sever the paneling into sections of required width. Both of the cutting or slitting units may be simultaneously used or one can be used as required.

Each unit includes a supporting bracket 111 carrying a motor 112 which rotates a cutting blade 113 (FIG. 1). Each of the cutting blades is contained in an arcuate hood or guard 114 provided with an outlet tube 115 communicating with the dust collection pipe 41 as shown in FIG. 1. The hand-wheels 116 provide for the raising and lowering of the slitting units, while the hand-wheels shown at 117 provide for the clamping of the units on the shaft 110 at the required positions across the width of the machine to secure panels of the required width. Carried on an arm 118, pivoted at one end at 119 to one of the hoods 114, is a pressure roller 120 which holds down the paneling during the slitting operation.

The means for cutting the paneling into the required lengths is shown at 130 in FIG. 6 and the same includes a carriage movable across the table 131 on which the paneling, diagrammatically shown at 132, is moved after having the slitting operation performed on it. The carriage includes a motor 133, operating a rotary cutting blade 134, and the paneling is cut off into the required lengths by the travel of the cutting unit across the apparatus. The operation of the cutting mechanism at properly timed intervals to insure the production of panel lengths of the required size is controlled by a switch 135 with which the forward end of the paneling contacts on its travel toward the left in FIG. 6.

During the cutting operation, the dust created thereby is drawn off through the tube 136 to the dust collection pipe 41. Dust is blown from the top of the severed panels by means of the blower shown at 137.

After the paneling is severed into lengths as just described, the severed sections or boards are moved along on supporting rollers 138 by means of a driving roll 139, driven by the chain 141 from motor 140. The severed panel lengths are delivered from the apparatus as shown at 143 to a truck 144 or other supporting means upon which they are stacked as shown at the left in FIG. 6.

From the foregoing, the operation of the described apparatus will be readily understood. The paneling or sheet material, as produced by the apparatus of co-pending application Ser. No. 258,105 or by other suitable mechanism, reaches the edge-finishing means shown at the right in FIG. 1, where the cutters 31, 32, 31a and 32a operate on the opposite edges of the paneling to shape and finish said edges as required. The edge-finished paneling next reaches the grooving mechanism and passes between the disks 61 on the shaft 62 and the similar disks on the lower shaft 62a and by which disks the paneling is grooved substantially as shown in FIG. 7. Thereafter the grooved paneling continues across the table section 8 to pass between the surfacing rolls 84 and 85 to be operated on thereby. The paneling then proceeds to the slitting knives 120 by which it is split longitudinally into sections of required width. The split paneling then proceeds to the cutter 134 which cuts off the panel sections which are then delivered onto the truck 144 or to other collection means.

The mechanism herein described is shown as being capable of performing a number of operations in sequence namely, edge-finishing, surface-finishing, longitudinal slitting, grooving and severance into panel lengths. It will be understood however, that the several mechanisms can be selectively used. That is to say, if for example, the paneling need not be longitudinally split, the cutters 113 are merely held in a raised position to enable the paneling to pass under them without being acted upon by the cutters. Similarly, the edge-finishing means or the surfacing rollers can be readily rendered inoperative when their action upon the paneling is not required.

Having thus described a single embodiment of the invention, it is obvious that the same is not to be restricted thereto, but is broad enough to cover all structures coming within the scope of the annexed claims.

What is claimed is:

1. An apparatus for finishing paneling such as that composed of foam plastic comprising, cutters arranged oppositely to one another along adjacent the opposite edges of a moving panel for shaping said edges, holddown means for the paneling adjacent to the cutters, means for forming longitudinal grooves in the paneling after it leaves the cutters, means for longitudinally slitting the panel after it has been grooved by the grooving means, means for surfacing the opposite faces of the paneling after it is grooved and before it is slit, and means for transversely cutting the panel into lengths.

2. In an apparatus for finishing paneling such as that composed of foam plastic comprising, means operative against the opposite edges of the paneling to shape said edges, said means comprising independently driven cutters, of different diameters operative on vertical axes, and means for independently raising or lowering the cutters and their driving means to cause a part of one cutter to operate on each degree of the paneling or to cause a plurality of the cutters to operate against each edge.

3. An apparatus for the finishing of paneling such as that composed of foam plastic comprising, edge-finishing means in the form of adjustable cutters located opposite to one another at the opposite edges of the paneling said cutters being independently driven and operating on vertical axes, rolls between which the paneling is moved after treatment by said edge-finishing means, said rolls constituting surface-finishing elements operative against the opposite faces of the paneling, and a cutter movable transversely of the paneling after the surface-finishing operation to sever the same into predetermined lengths.

4. An apparatus for the finishing of paneling comprising, a table along which the paneling to be finished is moved, guide means operative along the sides of the table for guiding the paneling along the table, cutters operative on vertical axes for trimming the edges of the paneling, means for next forming longitudinal grooves in the opposite faces of the paneling after the edge-trimming operation, upper and lower rollers between which the panel is passed after having been grooved to surface the opposite faces of the paneling, cutters operative longitudinally of the paneling after the paneling has been surfaced to split the paneling into sections of predetermined width, cutting means thereafter operative transversely of the paneling to sever the paneling into lengths, and means for thereafter delivering the severed lengths onto a support.

5. In an apparatus for the finishing of paneling such as that composed of foam plastic, cutting means operative against an edge of the paneling to shape said edge, the cutting means comprising a plurality of rotary cutters of different diameters by which one portion of the edge of the paneling can be operated on by a cutter of one diameter and another portion of said edge can be operated on by a cutter of a different diameter, the cutters being operative on a vertical axis, the cutters being simultaneously operative on opposite edges of the paneling, means for adjusting the oppositely-positioned cutters toward or away from one another, and at least one pressing roller located between the oppositely disposed cutters for holding down the paneling during the trimming of the edges thereof.

6. In an apparatus according to claim 5, wherein the cutters at one edge of the paneling are driven by means independent of the drive means for the cutters at the opposite edge of the paneling, and the cutters as well as the drive means therefor are capable of raising and lowering movement, and a pressing roller is located adjacent to each group of the cutters.

7. An apparatus for finishing paneling such as that composed of foam plastic and which paneling is delivered to the apparatus in continuous form comprising, a pair of edge trimming cutters located opposite to one another and simultaneously operative on the opposite edges of the paneling to shape said edges, said cutters having independent drive means and being mounted for raising or lowering adjustment, a roller located adjacent to each of the cutters for holding down the paneling during the edge-trimming operation, a pair of grooving rollers between which the paneling passes after the edge-trimming operation, a second pair of rollers between which the paneling passes for surfacing of the opposite faces of the paneling after the grooving operation, slitting means to which the paneling passes after having been grooved and which splits the paneling longitudinally, cutting means to which the paneling passes after having been longitudinally split and which is operative transversely of the split paneling to divide it into lengths, and means for delivering the split sections of predetermined length from the apparatus.

8. An apparatus for finishing foam plastic paneling and which is fed in continuous form to the apparatus comprising, edge-finishing means, grooving means, surfacing means, longitudinally splitting means, transverse cutting means and delivery means operative on the paneling in the order named, said means being adjustable whereby any of said means can be selectively made operative or inoperative to thereby determine which of said means will be operative or inoperative on the paneling as the same is fed through the apparatus so that the delivered cut panels will be shaped, surfaced and formed according to the means which operated during the passage of the paneling through the apparatus.

References Cited

UNITED STATES PATENTS

| | | |
|---|---|---|
| 97,092 | 11/1869 | Jenkins. |
| 262,167 | 8/1882 | Welch _____ 144—39 |
| 321,377 | 6/1885 | Mahaffy _____ 144—37 |
| 366,841 | 7/1887 | Johnson _____ 144—37 |
| 393,238 | 11/1888 | Johnson _____ 144—37 |
| 515,313 | 2/1894 | Blaisdell _____ 144—36 |
| 2,276,240 | 3/1942 | Nicholson et al. _____ 144—36 |
| 2,790,472 | 4/1957 | Fata _____ 144—36 X |
| 3,008,501 | 11/1961 | Hammer _____ 144—37 X |

JAMES M. MEISTER, *Primary Examiner.*